United States Patent
Cors et al.

(10) Patent No.: US 10,545,837 B2
(45) Date of Patent: Jan. 28, 2020

(54) EXTENDING DEPLOYED CLOUD INFRASTRUCTURE FOR DISASTER RECOVERY SEQUENCING

(71) Applicant: International Business Machines Corporation, Armonk, NY (US)

(72) Inventors: Josep Cors, Rochester, MN (US);
Naresh Nayar, Rochester, MN (US);
Birgit M. Pfitzmann, Zurich (CH);
Oliver Raff, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 15/899,517

(22) Filed: Feb. 20, 2018

(65) Prior Publication Data

US 2019/0258551 A1    Aug. 22, 2019

(51) Int. Cl.
*G06F 9/455*   (2018.01)
*G06F 11/14*   (2006.01)

(52) U.S. Cl.
CPC ...... *G06F 11/1469* (2013.01); *G06F 9/45558* (2013.01); *G06F 2009/4557* (2013.01); *G06F 2009/45583* (2013.01); *G06F 2009/45595* (2013.01); *G06F 2201/815* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 7,685,187 B2 | 3/2010 | Hutchinson et al. | |
| 8,135,985 B2 | 3/2012 | Mishra et al. | |
| 8,214,687 B2 | 7/2012 | Colaiacomo et al. | |
| 8,984,325 B2 | 3/2015 | Garai et al. | |
| 9,477,555 B1 | 10/2016 | Hagan et al. | |
| 2011/0022879 A1 | 1/2011 | Chavda et al. | |
| 2012/0151273 A1 | 6/2012 | Ben Or et al. | |
| 2015/0363283 A1 | 12/2015 | Malnati et al. | |
| 2015/0370660 A1* | 12/2015 | Pershin | G06F 11/203 714/4.11 |
| 2016/0098324 A1* | 4/2016 | Sugabrahmam | G06F 9/50 714/6.23 |
| 2016/0357593 A1 | 12/2016 | Kedem | |

(Continued)

OTHER PUBLICATIONS

"Solution Brief: Backup and Disaster Recovery," SoftLayer, Jan. 2018, 1 page.

(Continued)

*Primary Examiner* — Charlie Sun
(74) *Attorney, Agent, or Firm* — VanLeeuwen & VanLeeuwen; Christopher M. Pignato

(57) ABSTRACT

An approach is provided in which an Infrastructure as a Service (IaaS) system is established in a cloud that includes a plurality of virtual machines. Each of the plurality of virtual machines are allocated to one or more of a plurality of datastores based on one or more user inputs. Next, one of a plurality of priorities are assigned to each of the plurality of virtual machines based on the one or more of the plurality of datastores to which each of the plurality of virtual machines is allocated. In turn, the virtual machines are recovered in the cloud in an order determined, at least in part, by their assigned one of the plurality of priorities.

20 Claims, 12 Drawing Sheets

(56) References Cited

U.S. PATENT DOCUMENTS

2016/0366218 A1  12/2016  Cors et al.

OTHER PUBLICATIONS

"Site Recovery Manager Administration," Site Recovery Manager 5.8, VMware, 2017, 163 pages.
Neethiraj, "Tag Based Policies," Apache Software Foundation, Oct. 2015, 11 pages.
"Watson Discovery," International Business Machines Corporation, Aug. 2015, 10 pages.
"Watson Knowledge Studio," International Business Machines Corporation, Aug. 2015, 3 pages.
"Scaling Based on a Queue-based Workload," Google, Nov. 2017, 4 pages.
"Defining scaling policies to manage workload," International Business Machines Corporation, Aug. 2015, 3 pages.
Welch, "Chef Launches Policy-Based Provisioning," Chef Blog, Nov. 2014, 9 pages.
"Prioritizing Your Applications," Microsoft, Jan. 2018, 2 pages.
"VMware Hybrid Cloud Extension," VMware, Sep. 2017, 1 page.
Kim et al., "Allowing User-Specified Failure Handling in Web Services Composition," ICUIMC '08 Proceedings of the 2nd international conference on Ubiquitous information management and communication, Jan. 2008, Suwon, Korea, pp. 452-458.
Maitra et al., "Disaster Recovery Planning with Virtualization Technologies in Banking Industry," ICWET '11 Proceedings of the International Conference & Workshop on Emerging Trends in Technology, Feb. 2011, Mumbai, India, pp. 298-299.
Rajagopalan et al., "SecondSite: Disaster Tolerance as a Service," VEE '12 Proceedings of the 8th ACM SIGPLAN/SIGOPS Conference on Virtual Execution Environments, Mar. 2012, London, England, pp. 97-107.
Wang et al., "Activating Protection and Exercising Recovery Against Large-Scale Outages on the Cloud," 2016 46th Annual IEEE/IFIP International Conference on Dependable Systems and Networks Workshop (DSN-W), Jun. 2016, Toulouse, France, p. 264.

\* cited by examiner

400

| USER-SELECTABLE DATASTORE ALLOCATION CONFIGURATIONS | | |
|---|---|---|
| ALLOCATION TYPE | CONFIGURATION | DISASTER RECOVERY |
| Single Allocation | VM (VM's disks) assigned to one datastore. | Disaster recovery based on priority of datastore. |
| Shared Allocation | VM assigned to a shared datastore with selectable datastore classes (recovery priority tier). | Disaster recovery based on datastore priority. |
| Dynamic Allocation (Application DR Groups) | Dynamically generate datastores and classes as an application data recovery group (ADG). VM assigned to ADG. | Disaster recovery based on relative priority of ADG. |

EXTENDING DEPLOYED CLOUD INFRASTRUCTURE FOR DISASTER RECOVERY SEQUENCING

BACKGROUND

Infrastructure as a service (IaaS) is a cloud computing service in which a vendor provides users access to computing resources such as servers, storage, and networking. IaaS 1) allows users pay for IaaS on demand instead of purchasing hardware outright; 2) uses scalable infrastructure that depends on processing and storage needs, 3) saves enterprises the costs of buying and maintaining their own hardware, and 4) enables the automation of administrative tasks and frees up time for other work.

An IaaS provider hosts the infrastructure components traditionally present in an on-premises data center, including servers, storage and networking hardware, as well as the virtualization or hypervisor layer. The IaaS provider also supplies a range of services to accompany those infrastructure components. Services can include detailed billing, monitoring, log access, security, load balancing and clustering, as well as storage resiliency such as backup, replication and disaster recovery.

Disaster recovery services are typically measured by recovery point objective (RPO) (e.g., maximum data loss) and recovery time objectives (RTO) (e.g., maximum time to recover). Disaster recovery typically involves a set of policies, tools, and procedures to enable the recovery or continuation of vital technology infrastructure and systems following a natural or human-induced disaster.

BRIEF SUMMARY

According to one embodiment of the present disclosure, an approach is provided in which an Infrastructure as a Service (IaaS) system is established in a cloud that includes a plurality of virtual machines. Each of the plurality of virtual machines are allocated to one or more of a plurality of datastores based on one or more user inputs. Next, one of a plurality of priorities are assigned to each of the plurality of virtual machines based on the one or more of the plurality of datastores to which each of the plurality of virtual machines is allocated. In turn, the virtual machines are recovered in the cloud in an order determined, at least in part, by their assigned one of the plurality of priorities.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) establishing an Infrastructure as a Service (IaaS) system in a cloud that includes a plurality of virtual machines, wherein each of the plurality of virtual machines are allocated, based on one or more user inputs, to one or more of a plurality of datastores; (ii) assigning one of a plurality of priorities to each of the plurality of virtual machines based on the one or more of the plurality of datastores to which each of the plurality of virtual machines is allocated; and (iii) recovering the plurality of virtual machines in the cloud in an order determined, at least in part, by their assigned one of the plurality of priorities.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is an exemplary table depicting user selectable virtual machine datastore allocation configurations;

DETAILED DESCRIPTION

Figure 1:
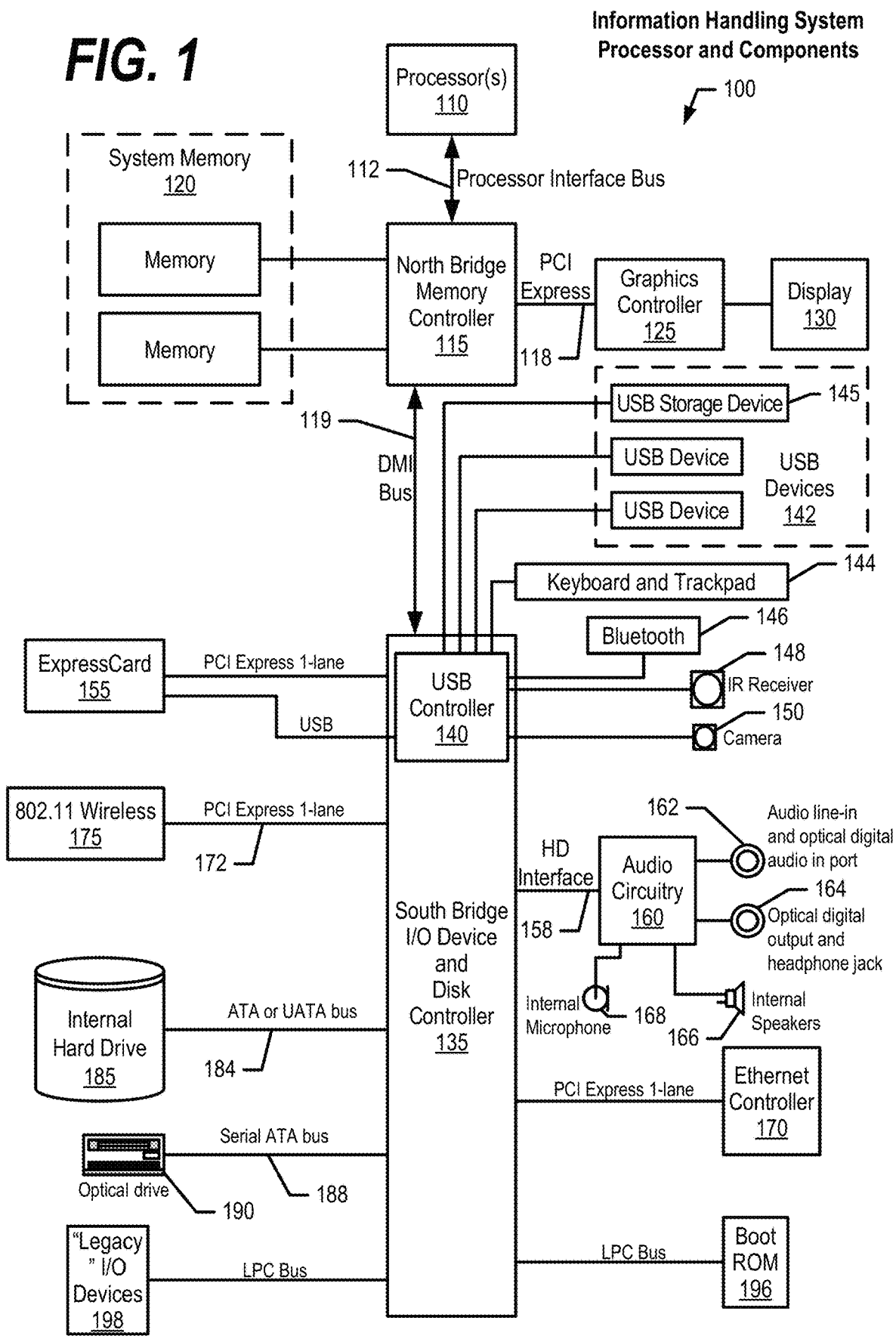
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
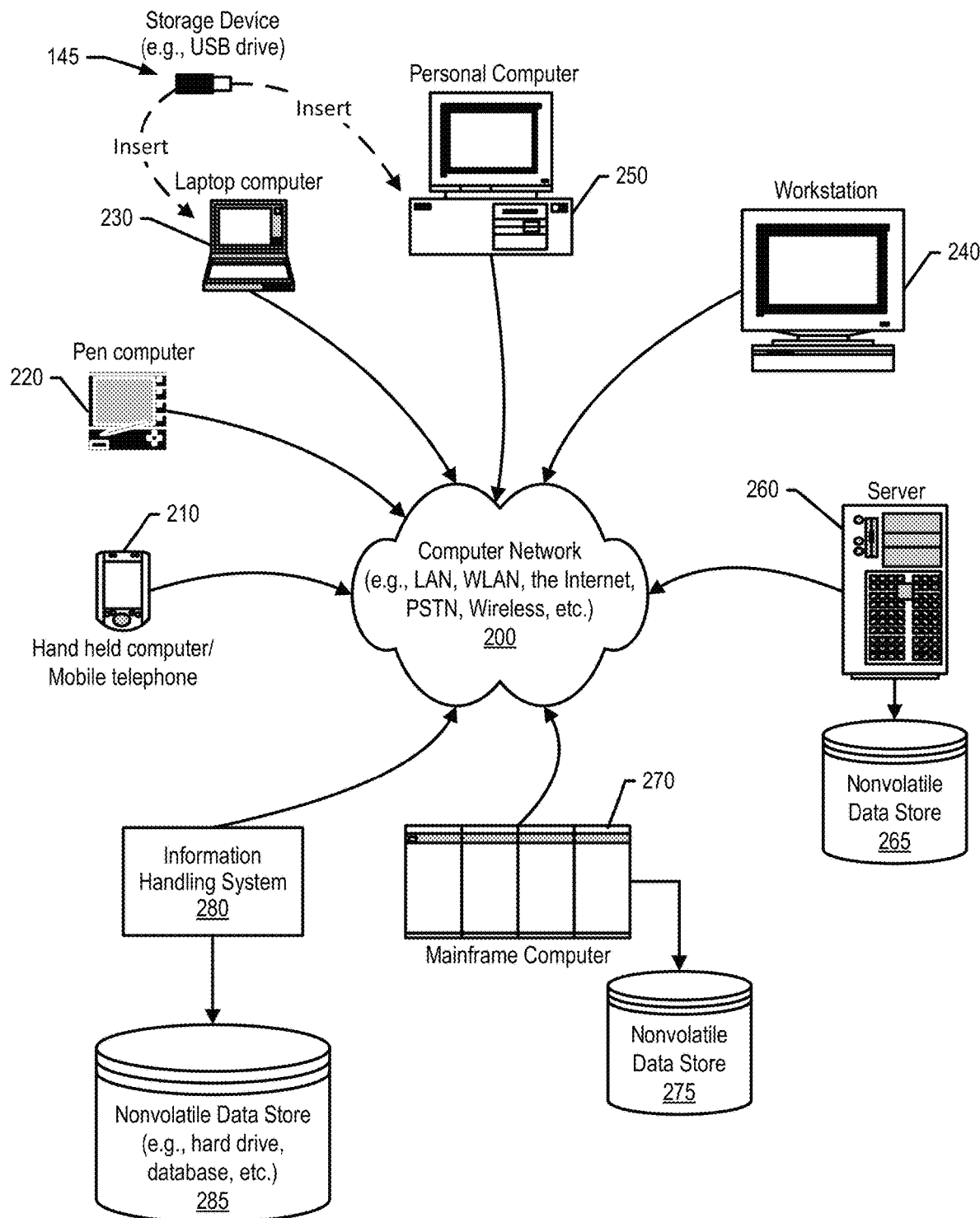
FIG. 2 provides an extension of the information handling system environment shown in FIG. 1 to illustrate that the methods described herein can be performed on a wide variety of information handling systems which operate in a networked environment

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, IaaS providers require a disaster recovery capability that ensures data is protected and effectively recovered in the event of a disaster. A challenge with today's systems is that their disaster recovery capabilities are not flexible and adaptable to user requirements. For example, a user is not able to prioritize and/or order the recovery of particular virtual machines within a business application, such as prioritizing a database before a web server, or prioritizing business applications of different importance. The user is also not able to specify time delays or checkpoints between the starts of different virtual machines in today's systems, such as ensuring that a database is fully operational before a web server starts.

Another challenge found with today's systems is that a user is not able to perform disaster recovery tests that simulate when an application fails over and production communication takes place on a different data center, even though some regulations require these tests for important business applications. In short, todays systems do not provide disaster recovery flexibility and adaptably required by a user.

FIGS. 3 through 12 depict an approach that can be executed on an information handling system that enables users to prioritize recovery of their virtual machines on an IaaS. The information handling system uses methodologies and systems to modify and extend an IaaS cloud to influence the recovery order and/or to enable disaster recovery tests with real fail-over. In addition, the information handling system allows a user to assign virtual machines to datastores with varying classes (tiers), which allows the user to create disaster recovery plans with different priorities based on the varying datastore classes. In turn, virtual machines are recovered in an order based on their corresponding disaster recovery plans' priorities and sequences assigned by the disaster recovery plan.

Figure 3:
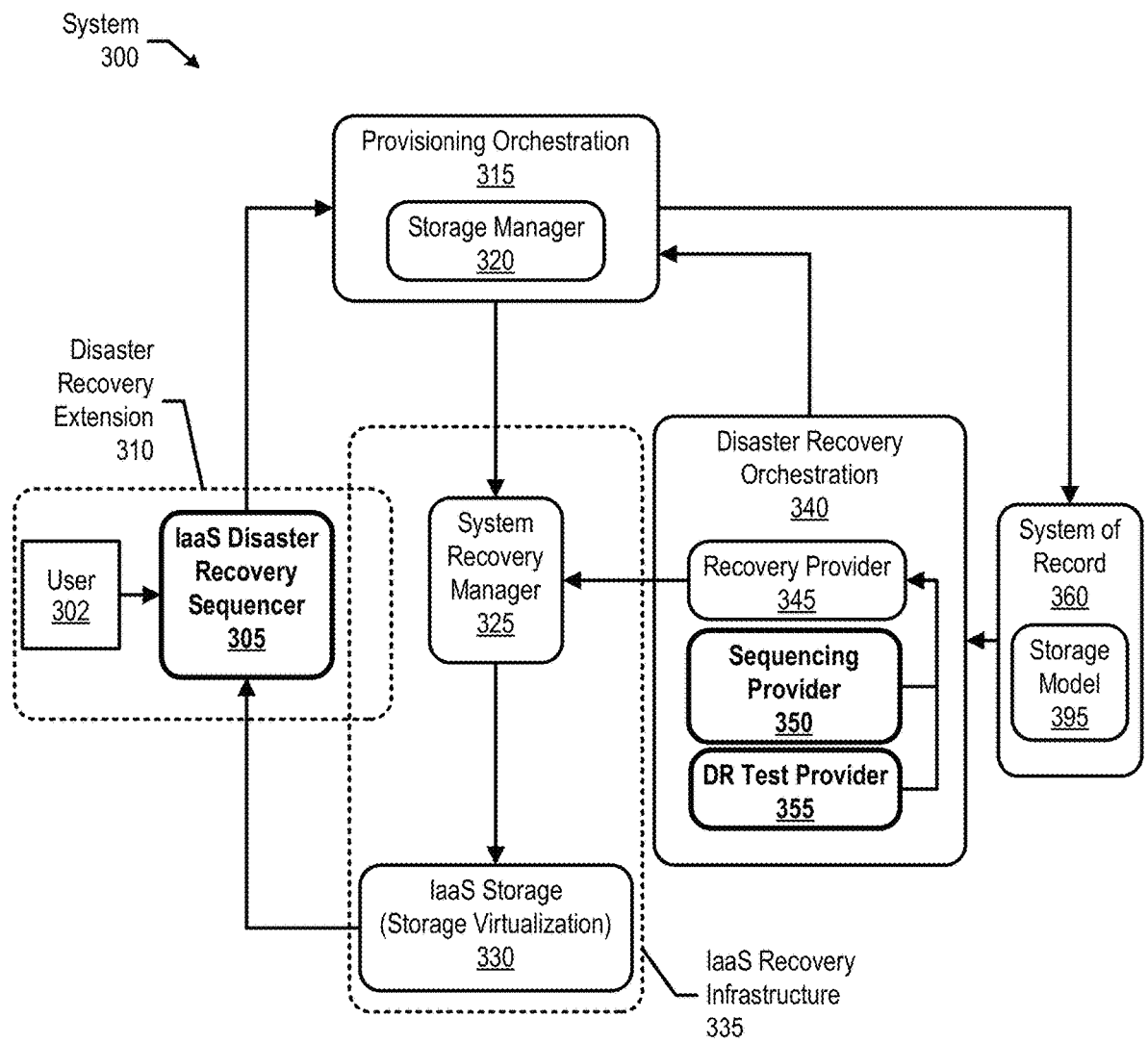
FIG. 3 is an exemplary diagram depicting an approach of expanding a disaster recovery system's capabilities by enhancing the datastore management capabilities of the system.

FIG. 3 is an exemplary diagram depicting an approach of expanding a disaster recovery system's capabilities by enhancing the datastore management capabilities of the system. As discussed herein, system 300 includes disaster recovery extension 310, which is an extension of IaaS recovery infrastructure 335, and allows user 302 to input user selectable datastore allocation configurations and customized disaster recovery requirements.

User 302 submits a virtual machine request using IaaS disaster recovery sequencer 305, which includes a datastore allocation type configuration and disaster recovery sequence parameters. Virtual machines executing in an IaaS use virtual disks (VMDKs) for their operating system, application software, and other data files, which are stored on one or more datastores. A datastore is a large storage unit that may include many virtual disks of different user virtual machines. Referring to FIG. 4, a user may assign virtual machines (e.g., their virtual disks) to various datastore allocation types, such as a single allocation, a shared allocation, and a dynamic allocation.

A single or multiple not shared datastores allocation assigns a virtual machine (each of the virtual machine's VMDKs) to the datastores. A shared datastore allocation assigns the virtual machine's VMDKs to one or multiple shared datastores that have corresponding disaster recovery priorities. A dynamic datastore allocation dynamically generates datastores and classes, and groups the datastores and classes into an application data recovery group (see FIGS. 9, 10, and corresponding text for further details). As described herein recovery plans have a priority, and virtual machines have a sequence within the recovery plans.

Provisioning orchestration 315 receives disaster recovery sequence parameters from IaaS disaster recovery sequencer 305, and saves the disaster recovery sequence parameters in system of record 360. Storage manager 320 creates storage on-the-fly to support required datastores or assigns virtual machines to existing datastore(s). Provisioning orchestration 315 also creates the related recovery plan and virtual machines are then "protected" to become part of the recovery plan to which their corresponding storage is assigned or related.

During a disaster recovery, disaster recovery orchestration 340 disables standard sequencing and power controls, and then turns control over to sequencing provider 350. Sequencing provider 350 manages server recovery order and applications inter-dependencies by informing recovery provider 345 to instruct system recovery manager 325 to recover virtual machines (e.g., recover datastores via IaaS Storage 330) according to their order in the disaster recovery plan stored in system of record 360 (see FIG. 11 and corresponding text for further details). In one embodiment, if system 300 has an alternative approach to prioritize virtual machines, system 300 may maintain standard sequencing and power controls and also use disaster recovery plans with priority to control for additional recovery ordering.

Storage model 395 associates datastores to recovery plans and which virtual machines belong to recovery plans. In other words, storage model 395 is the modeling of the storage infrastructure and their related disaster recovery parameters so disaster recovery orchestration 340 can operate during a disaster recovery. Disaster recovery test provider 355 instructs recovery provider 345 to recover virtual machines according to their order in a disaster recovery test plan (see FIG. 12 and corresponding text for further details).

In one embodiment, system 300 may allow user 300 to input a service request to change the disaster recovery settings of a current virtual machine and the service request propagates through system 300 to change its corresponding system of record 360. In another embodiment, system 300 may provide an option in the provisioning request to make the disaster recovery settings of one virtual machine similar to another virtual machine. This is particularly useful in variants where user 302 does not simply input a priority (which could easily be looked up from the other virtual machine), but rather inputs dependencies, etc. during a virtual machine request.

In yet another embodiment, the approach described herein may function with software-defined networks where internet protocol (IP) addresses are retained in a disaster, or with hard-coded networks where a disaster recovery site has different IP addresses. This embodiment may use system recovery manager post-processing, or may be performed by cloud orchestration itself.

In yet another embodiment, the IaaS cloud may offer preprocessing to help a user map dependency graphs to disaster recovery classes. For example, the user or a PaaS (platform as a service) cloud may input an application topology, possibly with time constraints between startup and a final RTO for the entire set of virtual machines, and the IaaS cloud would assign the application topology to suitable classes starting with the RTO of the earliest virtual machines in the dependency graph.

In yet another embodiment, datastores may be hidden from user 302 and different priorities or RTOs are described at the user interface. When different RTOs are promised, prices may be adapted so that not every user selects the lowest RTO. In this embodiment, the adapted prices may cover worse case scenarios such as to support more system recovery managers/virtual centers to achieve enough recovery in the promised time.

In yet another embodiment, to support timing issues such as enabling a database before a web server, an earliest start time may be specified for some classes (absolute or relative to the previous class). For example, a user or a PaaS pattern on top of the IaaS cloud may select a first class for a database, and a second class for a web server that only starts to be recovered a certain time period after the first class ends (see FIG. 6 and corresponding text for further details).

In yet another embodiment, in a hybrid system, an outside overall orchestration may also intermingle disaster recovery of non-cloud systems (e.g., mainframe virtual machines), or of different clouds, and PaaS-level recovery (e.g., databases with log shipping) with the IaaS-level recovery, where classes are only recovered upon additional input.

In yet another embodiment, user 302 may implement startup scripts and application monitoring that ensures that a web server reattempts to find its database and performs no external actions while missing the database.

In yet another embodiment, an IaaS cloud may offer approval flows and reports so that the business units can govern disaster recovery priorities among application owners, and the overall enterprise may govern priorities among business owners. In this embodiment, a central enterprise may control the complete sequence or the central enterprise assigns each business unit slots in the sequence or the RTOs fairly (e.g., at most 100 servers of each business unit in each time slot of length X, or at most 10% of each business unit's estate in each such time slot).

FIG. 4 is an exemplary table depicting user selectable virtual machine datastore allocation configurations. As discussed above, system 300 is able to provide a prioritized approach to disaster recovery by first providing user selectable, prioritized datastore allocation configurations and then creating disaster recovery plans based on the prioritized datastore allocation configurations. Table 400 shows three different datastore allocation configuration options, which are a single allocation, a shared allocation, and a dynamic allocation. Other configuration options may be available than those shown in FIG. 4.

In the single allocation configuration, a virtual machine's virtual disks are allocated to a datastore (the virtual machine related storage is not shared by other virtual machines). A user can then build one's own orchestration tool that schedules recovery in arbitrary ways (see FIG. 5 and corresponding text for further details). For example, a recovery plan X for a virtual machine may have priority X (higher priority) and another recovery plan Y for another virtual machine has priority Y (lower priority). In this example, a user may implicitly create a recovery sequence where the virtual machine in recovery plan X is a database (higher priority) and the virtual machine in recovery plan Y is an application server (lower priority).

In a shared allocation configuration, a virtual machine's virtual disks are allocated to shared datastores. The shared datastores have selectable datastore classes, which corresponds to various recover priority tiers or recovery order. For example, a class 1 shared datastore will be recovered before a class 2 shared datastore. The surrounding cloud orchestration for a disaster handles the recovery order. The notion of "datastores" may be hidden from the user and just different priorities or RTOs described at the interface. If different RTOs are promised, prices may be adapted so that not everyone selects the lowest RTO. The prices would cover worst case scenarios such as to support more system recovery managers/virtual centers to achieve enough recovery in the promised time.

User 302 may select the shared allocation configuration to support timing constraints, such as enabling a database before a web server, an earliest start time may be specified for some classes (absolute or relative to the previous class). For example, a user or a PaaS pattern on top of the IaaS cloud may select a first class for a database, and a second class for a web server that only starts to be recovered a certain time period after the first class ends (see FIG. 6 and corresponding text for further details). A benefit of this option is that there is no need for central merging of disaster recovery schedules, such as from different business units in an enterprise user of a private cloud.

In a dynamic allocation configuration, named datastores are dynamically created with corresponding datastore classes and shown to a user as an application data recovery group. A user, in one embodiment, may configure application disaster recovery groups as follows: 1) one application data recovery group per application when the user wishes to test each application separately and assign priorities to the application data recovery groups; 2) multiple application data recovery groups for one application, such as to ensure that a database is fully operational before a web server is online; or 3) one application data recovery group for several applications when the business applications interact strongly and are tested and recovered together. The third configuration solves test problems because a datastore may only include virtual machines of applications that are tested together. In addition, the surrounding cloud orchestration may offer arbitrary independent schedules among different application data recovery groups.

Figure 5:
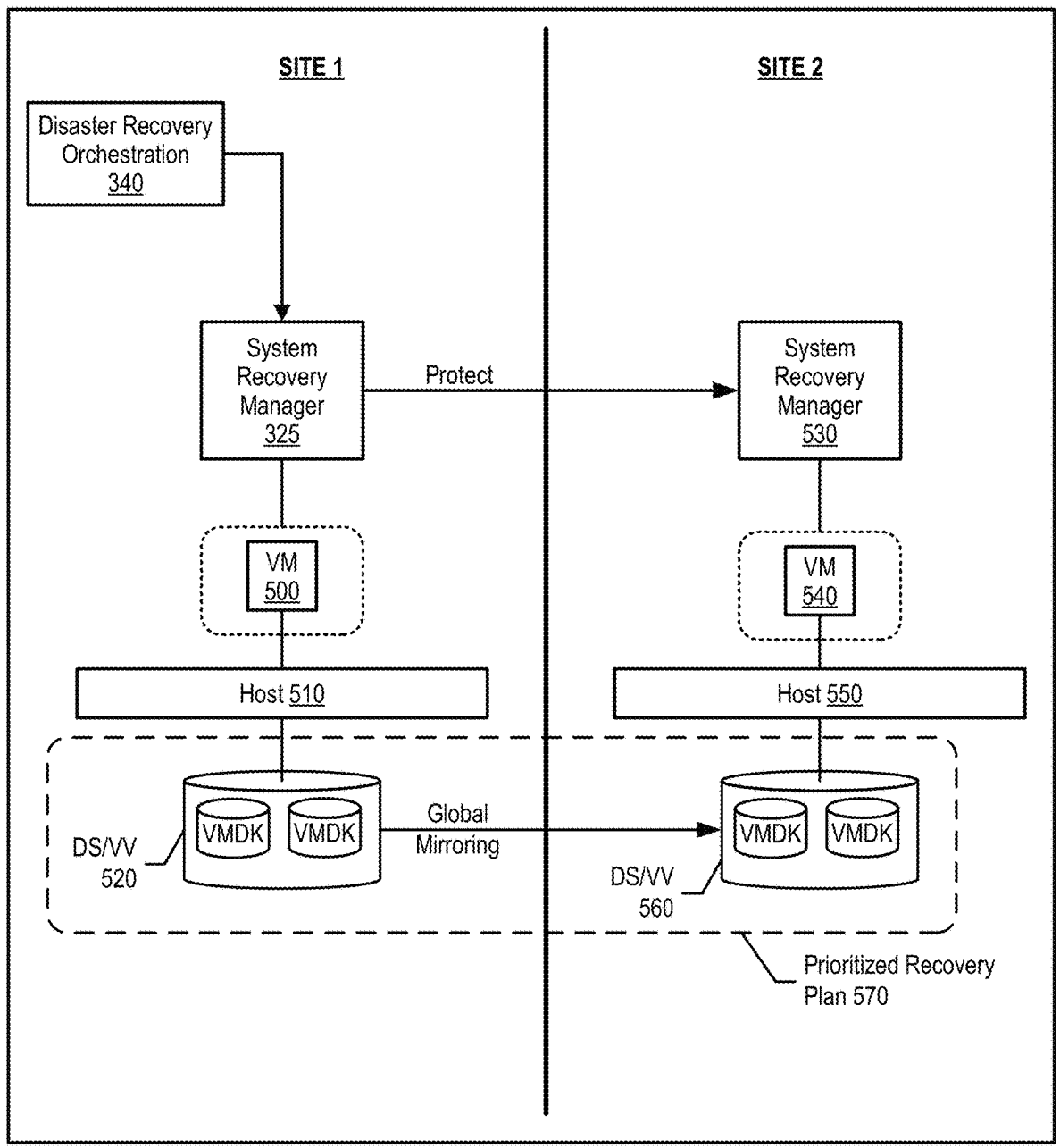
FIG. 5 is an exemplary diagram depicting execution of a prioritized recovery plan based on a single datastore allocation configuration.

FIG. 5 is an exemplary diagram depicting execution of a prioritized recovery plan based on a single database allocation configuration. During a disaster recovery, as discussed above, disaster recovery orchestration 340 utilizes sequencing provider 350 and recovery provider 345 to recover virtual machines according to their order in the disaster recovery plan stored in system of record 360.

Figure 11:
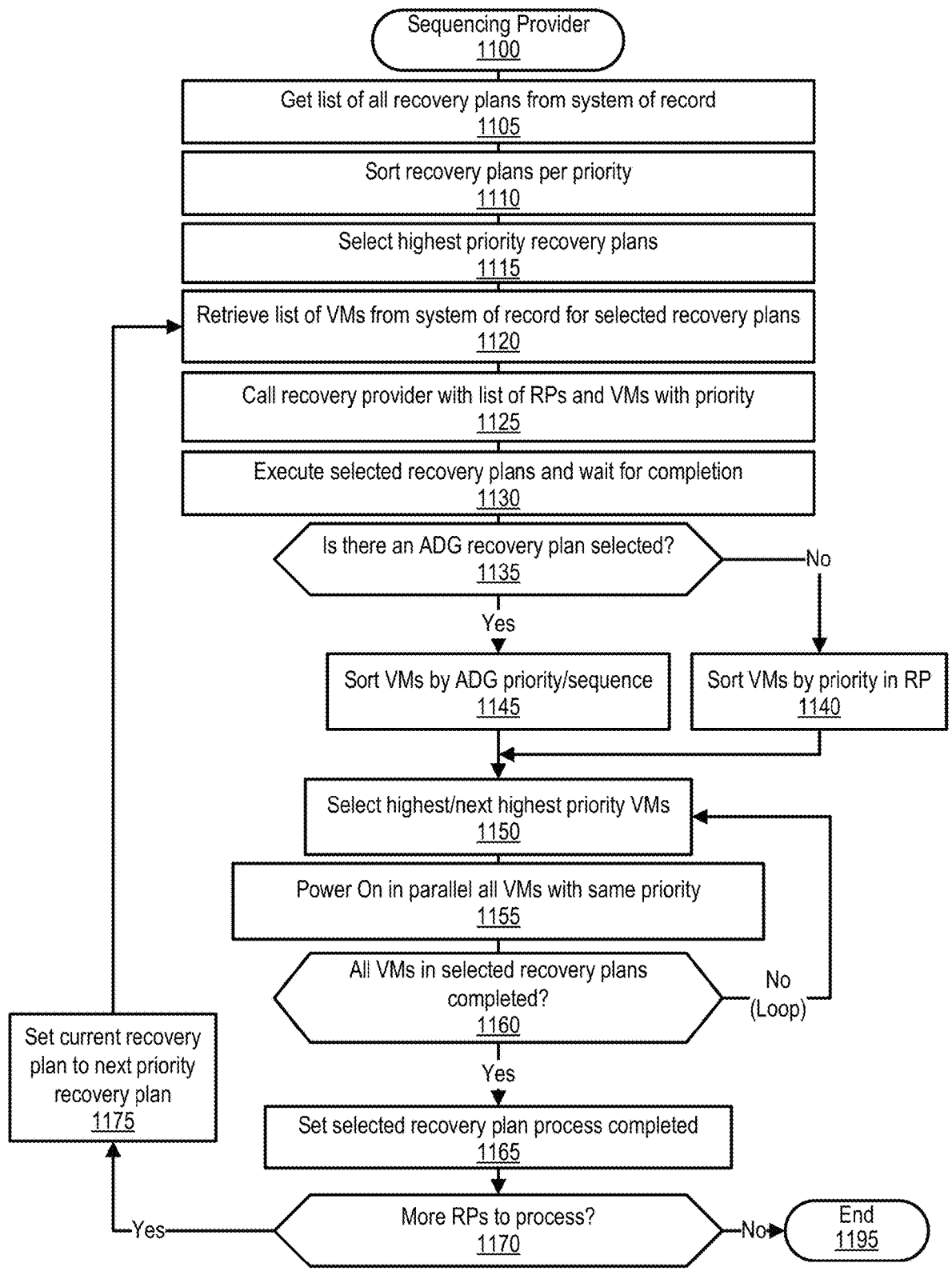
FIG. 11 is an exemplary diagram of steps taken by a sequencing provider during a disaster recovery.

Referring to FIG. 11, disaster recovery plans of the same priority are selected and then virtual machines of the same priority (their datastore priorities) within the selected disaster recovery plans are selected and recovered in parallel. For a virtual machine having a single datastore allocation, disaster recovery orchestration 340 instructs system recovery manager 325 to recover virtual machine 500 and datastore 520 based on the priority of its disaster recovery plan (prioritized recovery plan 570) and based on the priority of datastore 520. FIG. 5 shows that system recovery manager 325 interacts with system recovery manager 530 to recover virtual machine 500 and datastore 520 executing on host 510, onto host 550 as virtual machine 540 and datastore 560, respectively.

Figure 6:
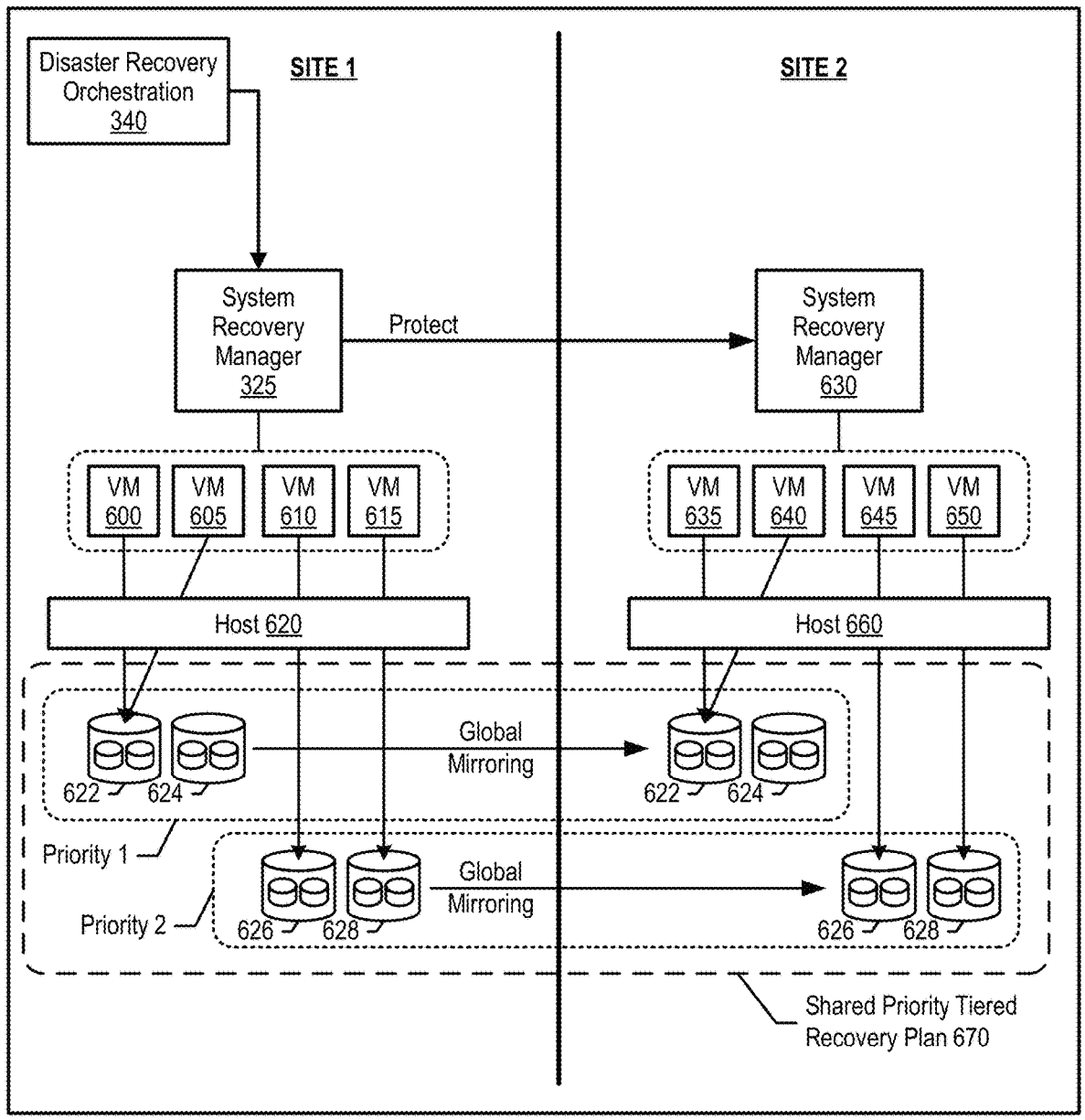
FIG. 6 is an exemplary diagram depicting execution of a shared priority tiered recovery plan based on a shared datastore allocation configuration.

FIG. 6 is an exemplary diagram depicting execution of a shared priority tiered recovery plan based on a shared database allocation configuration.

FIG. 6 shows that virtual machines 600, 605, 610, and 615 are allocated to share datastores 622, 624, 626, and 628, which are classified as either priority 1 or priority 2. When a disaster occurs, disaster recovery orchestration 340 instructs system recovery manager 325 to recover the virtual machines according to shared priority tiered recovery plan 670. System recovery manager 325 interfaces with system recovery manager 630 to first recover virtual machines 600 and 605 executing on host 620 and corresponding to priority 1 datastores 622 and 624, and then recover virtual machines 626 and 628 executing on host 620 and corresponding to priority 2 datastores 626 and 628. In turn, system recovery manager 630 recovers, on host 660, the virtual machines as virtual machines 635, 640, 645, and 650, and recovers the datastores as datastores 622, 624, 626, and 628.

Figure 7:
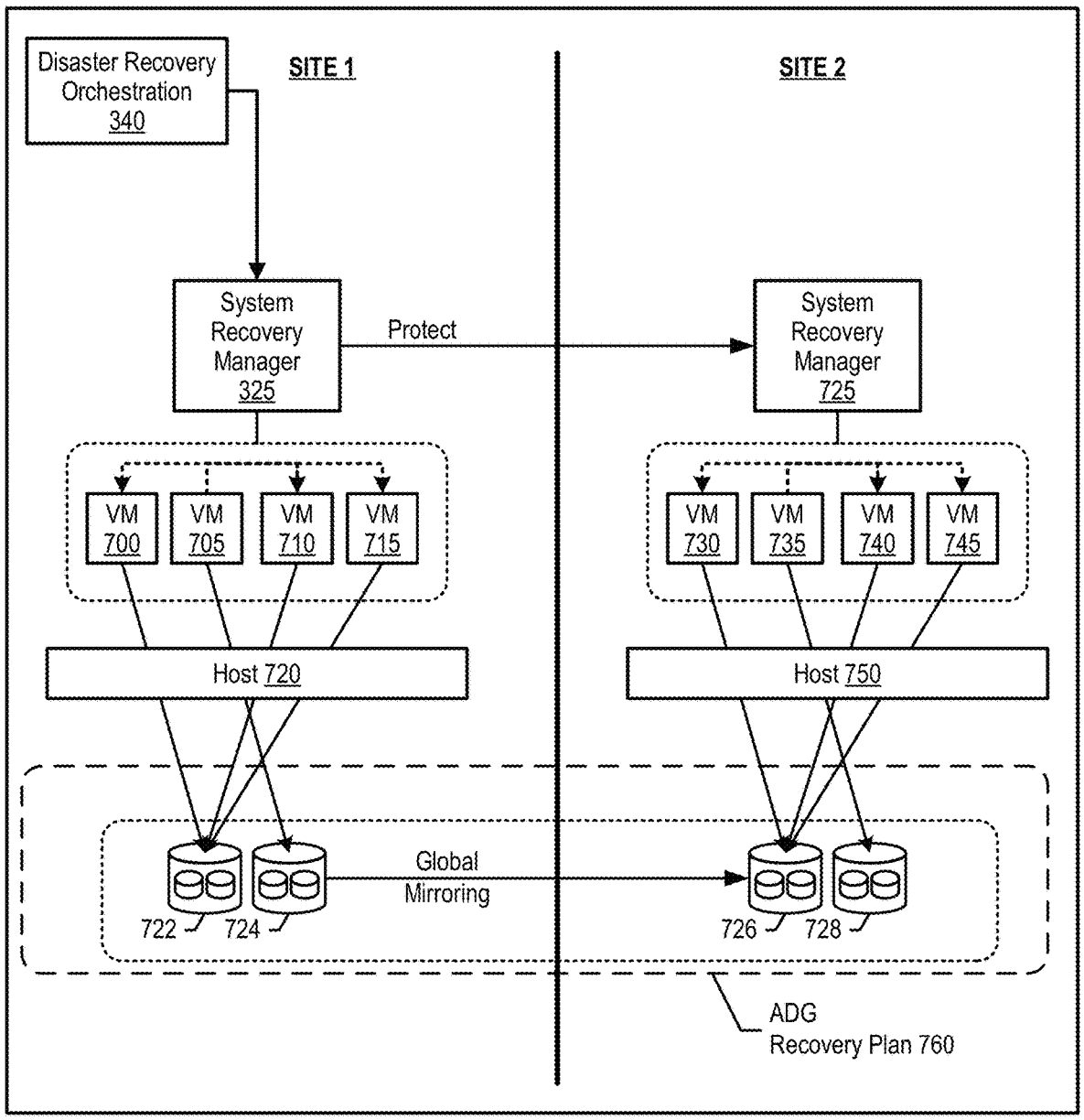
FIG. 7 is an exemplary diagram depicting execution of an application disaster recovery plan based on a dynamic datastore allocation configuration.

FIG. 7 is an exemplary diagram depicting execution of an application disaster recovery plan based on a dynamic datastore allocation configuration.

FIG. 7 shows that virtual machines 700, 705, 710, and 715 are allocated to share datastores 722 and 724, which are classified according to application data recovery group 760. When a disaster occurs, disaster recovery orchestration 340 instructs system recovery manager 325 to recover the virtual machines in an order specified in application data recovery group 760. System recovery manager 325 interfaces with system recovery manager 725 to recover virtual machines 700, 705, 710, and 715 executing on host 720 and their corresponding datastores 722 and 724. In turn, system recovery manager 725 recovers, on host 750, the virtual machines as virtual machines 730, 735, 740, and 745, and recovers the datastores as datastores 726 and 728.

Figure 8:
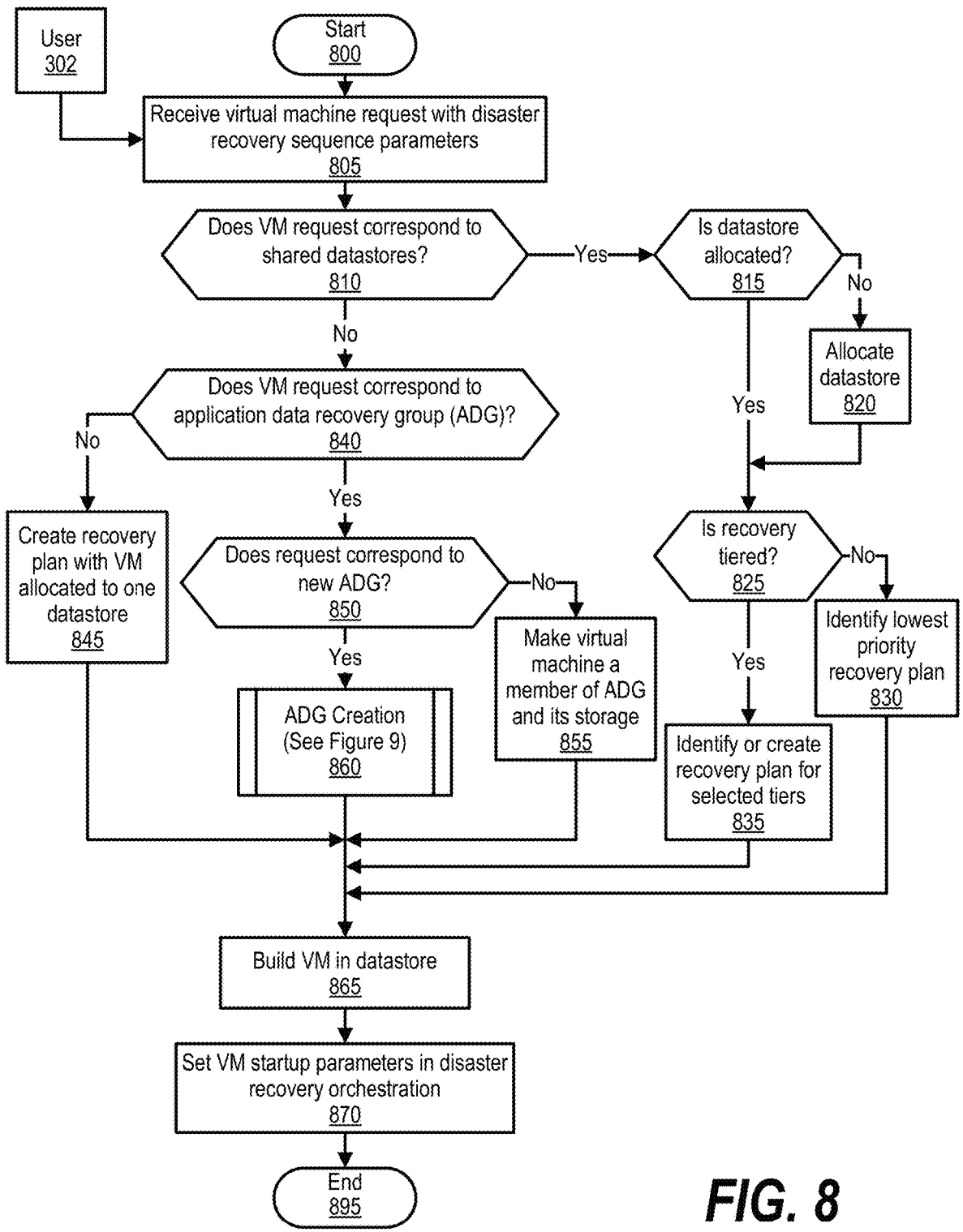
FIG. 8 is an exemplary flowchart depicting steps taken to create a prioritized disaster recovery plan based on user input.

FIG. 8 is an exemplary flowchart depicting steps taken to create a prioritized disaster recovery plan based on user input. FIG. 8 processing commences at 800 whereupon, at step 805, the process receives a virtual machine request with disaster recovery sequence parameters. In the machine request, the user defines a recovery class, IaaS priority selections, and sequencing parameters.

The process determines as to whether the VM request corresponds to shared datastores (e.g., whether the VMs disks should be allocated to shared datastores) (decision 810). If the request corresponds to shared datastores, then decision 810 branches to the 'yes' branch.

The process determines as to whether the shared datastores are already allocated to the system, such as from another virtual machine request (decision 815). If the shared datastores are already allocated, then decision 815 branches to the 'yes' branch. On the other hand, if the shared datastores are not yet allocated to the system, then decision 815 branches to the 'no' branch whereupon the process allocates datastores to the system at step 820.

The process determines as to whether the disaster recovery is tiered based on the selected virtual machine priority (decision 825). If the recovery plan is not tiered, then decision 825 branches to the 'no' branch whereupon, at step 830, the process identifies a lowest priority recovery plan. In other words, when a user does not select a tier and is using tier based recovery (e.g., intended to exist in a shared recovery plan domain), the process assigns a lowest priority.

On the other hand, if the recovery is tiered, then decision 825 branches to the 'yes' branch whereupon, at step 835, the process identifies recovery plans for the selected tiers, such as selecting tiers corresponding to pre-allocated storage pools. In one embodiment, the process dynamically creates a tier based on user input. When a user specifies a tier (recovery) that is not yet created, the process creates storage, a recovery plan, and assigns the desired tier to the recovery plan.

Referring back to decision 810, if the virtual machine request does not correspond to shared datastores, then decision 810 branches to the 'no' branch whereupon the process determines as to whether the virtual machine request corresponds to an application data recovery group (ADG) (decision 840). As discussed herein, when an application data recovery group is defined, the user defines its priority, order, and/or timing with respect to other application data recovery groups.

If the virtual machine request does not correspond to an application data recovery group, then decision 840 branches to the 'no' branch whereupon, at step 845, the process creates a recovery plan with the virtual machine allocated to one datastore (single allocation). On the other hand, if the virtual machine request corresponds to an application data recovery group, then decision 840 branches to the 'yes' branch. The process determines as to whether the virtual machine request corresponds to a new application data recovery group (decision 850). If the request corresponds to a new application data recovery group, then decision 850 branches to the 'yes' branch whereupon, at predefined process 860, the process creates the new application data recovery group according to the user's request (see FIG. 9 and corresponding text for processing details). On the other hand, if the request does not correspond to new application data recovery group, then decision 850 branches to the 'no' branch whereupon the process makes the virtual machine a member of an existing application data recovery group and its storage at step 855.

At step 865, the process builds virtual machine in its corresponding datastore and, at step 870, the process sets virtual machine startup parameters in disaster recovery orchestration 340. FIG. 8 processing thereafter ends at 895.

Figure 9:
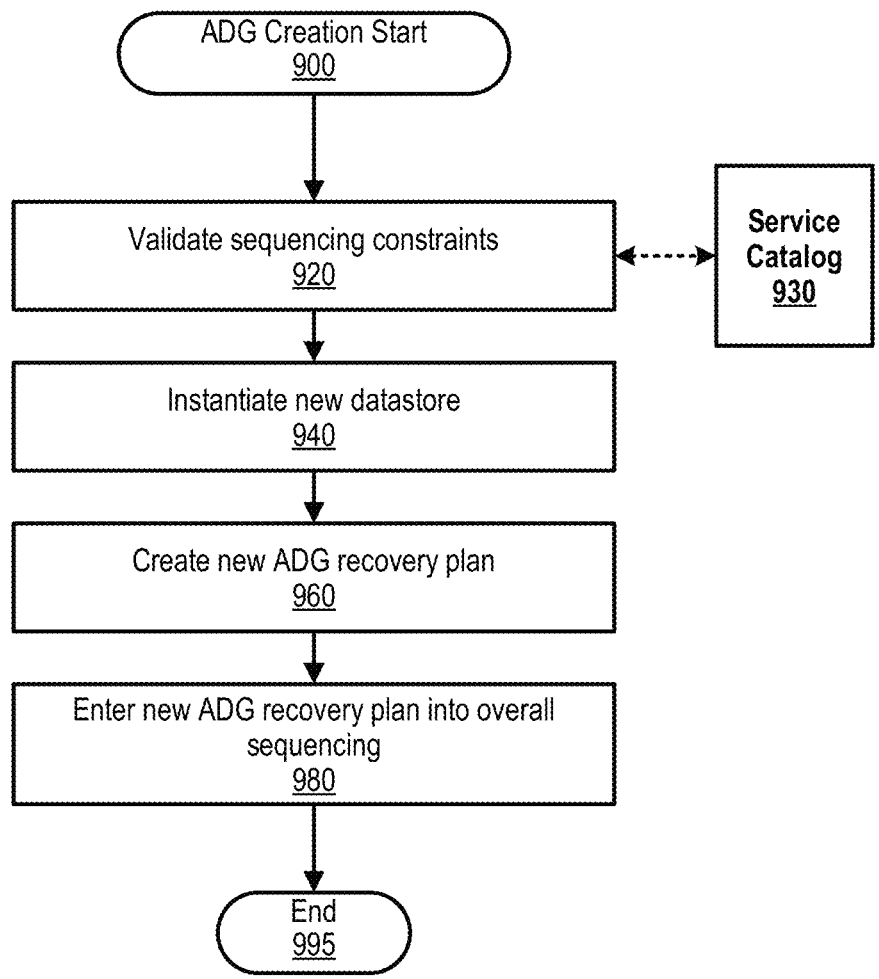
FIG. 9 is an exemplary flowchart depicting steps taken to create an application disaster recovery group.

FIG. 9 is an exemplary flowchart depicting steps taken to create an application disaster recovery group. When a user requests an application data recovery group, the user defines its priority, order, or timing with respect to other application data recovery groups. Constraints for a new application data recovery group may be in place, such as 1) a requested RTOs must fit ordering requirements (e.g., application data recovery groups later in a sequence cannot have shorter RTOs than earlier application data recovery groups); 2) one application owner may not push an application data recovery group of another owner back by adding an application data recovery group of his own before the other; and 3) the cloud tracks absolute and relative RTOs to ensure that it can indeed scale to them.

FIG. 9 processing commences at 900 whereupon, at step 920, the process validates the sequencing constraints (defined by user 302 in FIG. 8) with service catalog 930. At step 940, the process instantiates a new datastore (single or multiple) and, at step 960, the process creates a new application data recovery group recovery plan (see FIG. 10 and corresponding text for further details). At step 980, the process enters the new application data recovery group recovery plan into disaster recovery orchestration 340's overall sequencing via system of record 360. FIG. 9 processing thereafter ends at 995.

Figure 10:
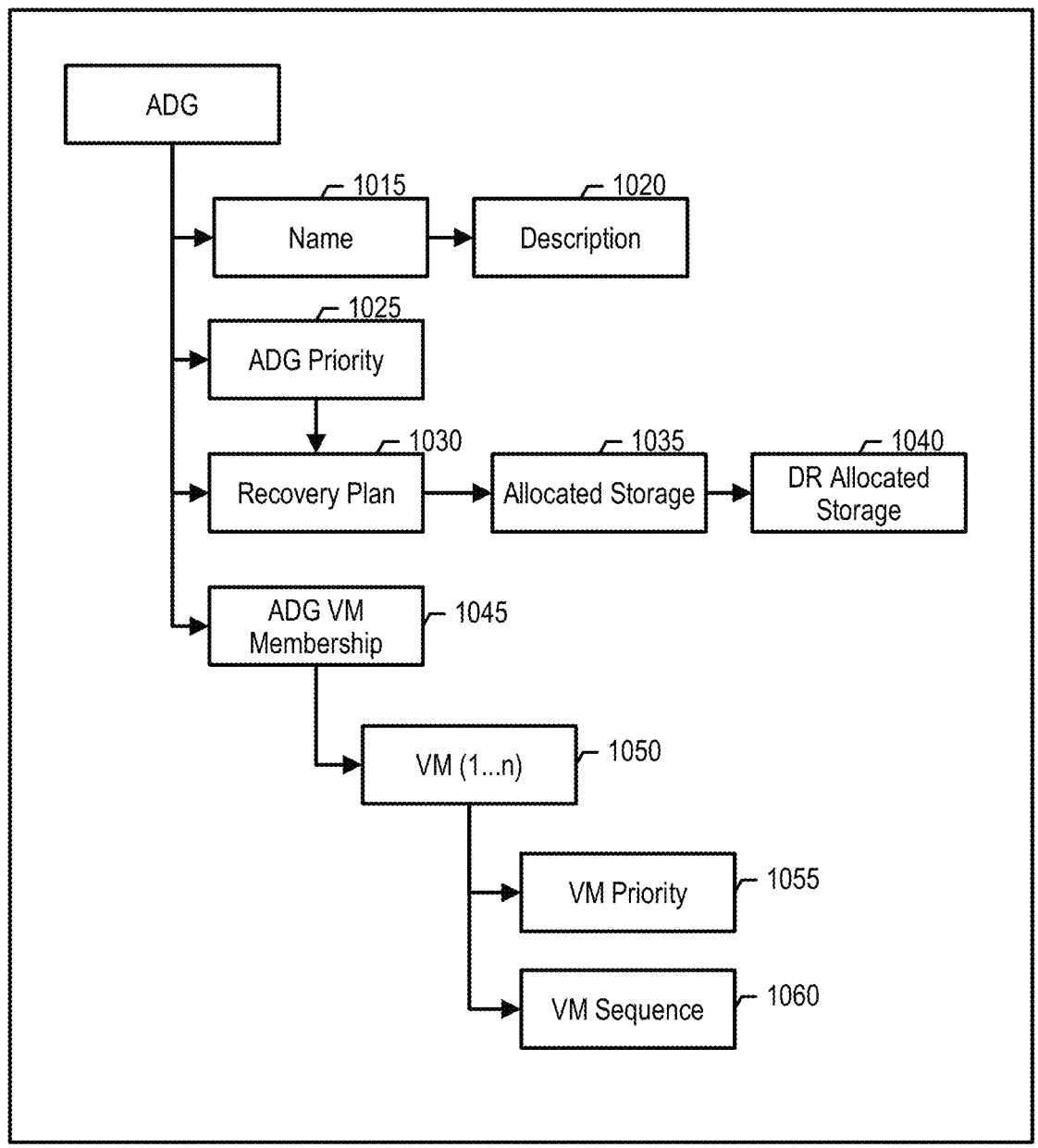
FIG. 10 is an exemplary diagram of application data recovery group elements.

FIG. 10 is an exemplary diagram of application data recovery group elements. Application data recovery group 1000 shows a possible element structure of an application data recovery group. The application data recovery group includes name 1015 and description 1020 specified by the user. The application data recovery group also includes application data recovery group priority 1025, which is a priority of the application data recovery group relative to other application data recovery groups. As discussed earlier, in one embodiment, a user may not push an application data recovery group of another owner back by adding an application data recovery group of his own before the other.

Application data recovery group priority 1025 points to recovery plan 1030, which includes allocated storage 1035 and disaster recovery allocated storage 1040 (global mirrored storage). The application data recovery group also includes application data recovery group virtual machine membership 1045, which defines virtual machine 1050, their corresponding virtual machine priorities 1055 (from recovery plan), and their corresponding virtual machine sequence 1060 (for power on control).

FIG. 11 is an exemplary diagram of steps taken by sequencing provider 350 during a disaster recovery. FIG. 11 processing commences at 1100 whereupon, at step 1105, the process retrieves a list of all recovery plans from system of record 360. At step 1110, the process sorts the recovery plans per recovery plan priority. At step 1115, the process selects the highest priority recovery plans. For example, there may be four priority 1 recovery plans, eight priority 2 recovery plans, and six priority 3 recovery plans.

At step 1120, the process retrieves lists of the virtual machines in the selected highest priority recovery plans (e.g., the virtual machines from the four priority 1 recovery plans). At step 1125, the process calls recovery provider 345 with the list of recovery plans and virtual machines with their priority. At step 1130, the process executes in parallel all recovery plans and waits for completion. During this step, the process may "inflate" a virtual machine, based on meta-data, stop or break a related global mirroring, make access to storage, etc., but does not power the virtual machine. Power on is disabled at this point and occurs in step 1155 discussed below.

The process determines as to whether there are an application data recovery group recovery plans in the selected highest priority recovery plans (decision 1135). If there are an application data recovery group recovery plans in the selected highest priority recovery plans, then decision 1135 branches to the 'yes' branch whereupon, at step 1145, the process sorts the virtual machines by the application data recovery group priority/sequence. On the other hand, if there are no application data recovery group recovery plans in the selected highest priority recovery plans, then decision 1135 branches to the 'no' branch whereupon, at step 1140, the process sorts the virtual machines by priority in their recovery plan.

At step 1150, the process selects the highest priority virtual machines and powers on the selected virtual machines in parallel (step 1155). The process determines as to whether all virtual machines in the selected recovery plans are completed (decision 1160). If all virtual machines in the selected recovery plans are not completed, then decision 1160 branches to the 'no' branch which loops back to select and process the next highest priority virtual machines. This looping continues until all of the virtual machines in the recovery plan are completed, at which point decision 1160 branches to the 'yes' branch exiting the loop.

At step 1165, the process sets the selected recovery plan(s) process(es) as completed and the process determines as to whether there are more recovery plans to process, such as a next highest priority recovery plan (decision 1170). If there are more recovery plans to process, then decision 1170 branches to the 'yes' branch which loops back to select (step 1175) and process the next highest priority recovery plans. This looping continues until there are no more recovery plans to process, at which point decision 1170 branches to the 'no' branch exiting the loop. FIG. 11 processing thereafter ends at 1195.

Figure 12:
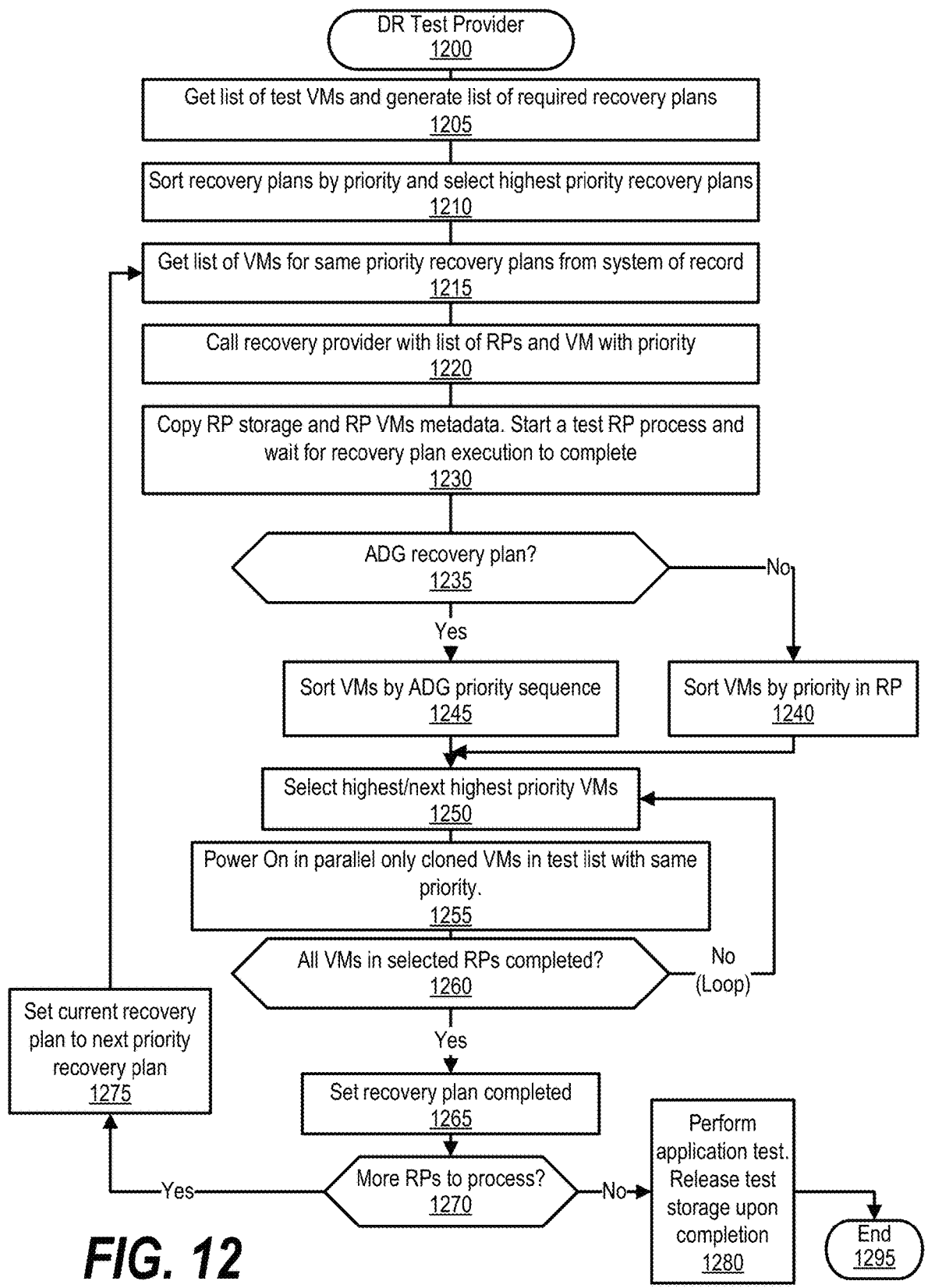
FIG. 12 is an exemplary diagram of steps taken by a disaster recovery test provider to test disaster recovery capabilities of a system.

FIG. 12 is an exemplary diagram of steps taken by disaster recovery test provider 355 to test disaster recovery capabilities of system 300. FIG. 12 processing commences at 1200 whereupon, at step 1205, the process gets a list of test virtual machines and generates a list of required recovery plans. In one embodiment, the disaster recovery test request may include information such as 1) a list of virtual machines provided by the user when requesting a disaster recovery test; and/or 2) a request to test a business application, which constitutes an inventory of virtual machines comprising the application and a list of virtual machines to test together. In this embodiment, the user may specify a list or a valid business application.

At step 1210, the process sorts the recovery plans by priority and selects the highest priority recovery plans. At step 1215, the process retrieves lists of the virtual machines in the selected highest priority recovery plans from system of record 360. At step 1220, the process calls recovery provider 345 with the list of recovery plans and virtual machines with their priority.

At step 1230, the process copies recovery plan storage, recovery plan metadata, and starts a test recovery plan process and waits for the recovery plan execution to complete. The process determines as to whether there are an application data recovery group recovery plans in the selected highest priority recovery plans (decision 1235). If there are an application data recovery group recovery plans in the selected highest priority recovery plans, then decision 1235 branches to the 'yes' branch whereupon, at step 1245, the process sorts the virtual machines by the application data recovery group priority/sequence. On the other hand, if there are no application data recovery group recovery plans in the selected highest priority recovery plans, then decision 1235 branches to the 'no' branch whereupon, at step 1240, the process sorts the virtual machines by priority in their recovery plan.

At step 1250, the process selects the highest priority virtual machines and, at step 1255, the process powers on in parallel only the cloned virtual machines in the test list with the same priority. The process determines as to whether all virtual machines in the selected recovery plans are completed (decision 1260). If all virtual machines in the selected recovery plans are not completed, then decision 1260 branches to the 'no' branch which loops back to select and process the next highest priority virtual machines. This looping continues until all of the virtual machines in the selected recovery plans are completed, at which point decision 1260 branches to the 'yes' branch exiting the loop.

At step 1265, the process sets the selected recovery plan(s) process(es) as completed and the process determines as to whether there are more recovery plans to process, such as a next highest priority recovery plan (decision 1270). If there are more recovery plans to process, then decision 1270 branches to the 'yes' branch which loops back to select (step 1275) and process the next highest priority recovery plans. This looping continues until there are no more recovery plans to process, at which point decision 1270 branches to the 'no' branch exiting the loop. At step 1280, the process performs an application test to test whether the disaster recovery was successful and releases the test storage upon completion. FIG. 12 processing thereafter ends at 1295.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    establishing an Infrastructure as a Service (IaaS) system in a cloud that includes a plurality of virtual machines, wherein each of the plurality of virtual machines are allocated, based on one or more user inputs, to one or more of a plurality of datastores;
    assigning one of a plurality of priorities to each of the plurality of virtual machines based on the one or more of the plurality of datastores to which each of the plurality of virtual machines is allocated; and
    recovering the plurality of virtual machines in the cloud in an order determined, at least in part, by their assigned one of the plurality of priorities.

2. The method of claim 1 further comprising:
    allocating each of the plurality of virtual machines to one or more disaster recovery plans, wherein the one or more disaster recovery plans assign a sequence to each of their corresponding assigned plurality of virtual machines; and
    performing the order of the recovering of the plurality of virtual machines based, at least in part, by their assigned one of the plurality of priorities and their assigned sequence.

3. The method of claim 1 further comprising:
    determining that a first set of the plurality of datastores correspond to a first datastore tier;
    assigning a first priority to a first set of the plurality of virtual machines allocated to the first set of datastores;
    determining that a second set of the plurality of datastores correspond to a second datastore tier that is a lower tier than the first datastore tier; and
    assigning a second priority to a second set of the plurality of virtual machines allocated to the second set of datastores, wherein the second priority is a lower priority than the first priority.

4. The method of claim 3 further comprising:
    selecting the first set of virtual machines to perform the recovering prior to the second set of virtual machines based on the first priority being a higher priority than the second priority.

5. The method of claim 1 further comprising:
    detecting that a first one of the one or more user inputs selects one or more shared datastores to allocate to a selected one of the plurality of virtual machines;
    in response to determining that the selected one or more shared datastores are unallocated to the IaaS, allocating the selected one or more shared datastores to the IaaS; and
    in response to allocating the selected one or more datastores to the IaaS, allocating the selected one or more datastores to the selected virtual machine.

6. The method of claim 5 further comprising:
    detecting that the first user input indicates a new datastore tier; and
    in response to determining that a disaster recovery plan does not exist to support the new data store tier, creating the disaster recovery plan to support the new datastore tier.

7. The method of claim 1 further comprising:
    instantiating one or more new datastores in response to detecting that a first one of the one or more user inputs corresponds to a new application disaster recovery group;
    incorporating the one or more new datastores into a new application disaster recovery group plan; and
    entering the new application disaster recovery group plan into a disaster recovery orchestration of the IaaS.

8. The method of claim 1 further comprising:
    disabling a standard sequencing and power controls of the IaaS prior to the recovering of the plurality of virtual machines.

9. The method of claim 1 further comprising:
    receiving a disaster recovery test list from a user that identifies a test set of virtual machines;
    determining one or more disaster recovery plans corresponding to the test set of virtual machines;
    sorting the one or more disaster recovery plans in an order based on their corresponding recovery plan order; and
    executing the one or more disaster recovery plans in an order, based in part, by their corresponding recovery plan priority.

10. The method of claim 9 wherein disaster recovery test list corresponds to a business application that comprises the test set of virtual machines.

11. An information handling system comprising:
    one or more processors;
    a memory coupled to at least one of the processors;
    a set of computer program instructions stored in the memory and executed by at least one of the processors in order to perform actions of:
        establishing an Infrastructure as a Service (IaaS) system in a cloud that includes a plurality of virtual machines, wherein each of the plurality of virtual machines are allocated, based on one or more user inputs, to one or more of a plurality of datastores;
        assigning one of a plurality of priorities to each of the plurality of virtual machines based on the one or more of the plurality of datastores to which each of the plurality of virtual machines is allocated; and
        recovering the plurality of virtual machines in the cloud in an order determined, at least in part, by their assigned one of the plurality of priorities.

12. The information handling system of claim 11 wherein the processors perform additional actions comprising:
    allocating each of the plurality of virtual machines to one or more disaster recovery plans, wherein the one or more disaster recovery plans assign a sequence to each of their corresponding assigned plurality of virtual machines; and
    performing the order of the recovering of the plurality of virtual machines based, at least in part, by their assigned one of the plurality of priorities and their assigned sequence.

13. The information handling system of claim 11 wherein the processors perform additional actions comprising:
    determining that a first set of the plurality of datastores correspond to a first datastore tier;
    assigning a first priority to a first set of the plurality of virtual machines allocated to the first set of datastores;

determining that a second set of the plurality of datastores correspond to a second datastore tier that is a lower tier than the first datastore tier;

assigning a second priority to a second set of the plurality of virtual machines allocated to the second set of datastores, wherein the second priority is a lower priority than the first priority; and selecting the first set of virtual machines to perform the recovering prior to the second set of virtual machines based on the first priority being a higher priority than the second priority.

14. The information handling system of claim 11 wherein the processors perform additional actions comprising:

detecting that a first one of the one or more user inputs selects one or more shared datastores to allocate to a selected one of the plurality of virtual machines;

in response to determining that the selected one or more shared datastores are unallocated to the IaaS, allocating the selected one or more shared datastores to the IaaS; and in response to allocating the selected one or more datastores to the IaaS, allocating the selected one or more datastores to the selected virtual machine.

15. The information handling system of claim 11 wherein the processors perform additional actions comprising:

instantiating one or more new datastores in response to detecting that a first one of the one or more user inputs corresponds to a new application disaster recovery group;

incorporating the one or more new datastores into a new application disaster recovery group plan; and entering the new application disaster recovery group plan into a disaster recovery orchestration of the IaaS.

16. The information handling system of claim 11 wherein the processors perform additional actions comprising:

receiving a disaster recovery test list from a user that identifies a test set of virtual machines;

determining one or more disaster recovery plans corresponding to the test set of virtual machines;

sorting the one or more disaster recovery plans in an order based on their corresponding recovery plan order; and executing the one or more disaster recovery plans in an order, based in part, by their corresponding recovery plan priority.

17. A computer program product stored in a computer readable storage medium, comprising computer program code that, when executed by an information handling system, causes the information handling system to perform actions comprising:

establishing an Infrastructure as a Service (IaaS) system in a cloud that includes a plurality of virtual machines, wherein each of the plurality of virtual machines are allocated, based on one or more user inputs, to one or more of a plurality of datastores;

assigning one of a plurality of priorities to each of the plurality of virtual machines based on the one or more of the plurality of datastores to which each of the plurality of virtual machines is allocated; and recovering the plurality of virtual machines in the cloud in an order determined, at least in part, by their assigned one of the plurality of priorities.

18. The computer program product of claim 17 wherein the information handling system performs further actions comprising:

allocating each of the plurality of virtual machines to one or more disaster recovery plans, wherein the one or more disaster recovery plans assign a sequence to each of their corresponding assigned plurality of virtual machines; and performing the order of the recovering of the plurality of virtual machines based, at least in part, by their assigned one of the plurality of priorities and their assigned sequence.

19. The computer program product of claim 17 wherein the information handling system performs further actions comprising:

instantiating one or more new datastores in response to detecting that a first one of the one or more user inputs corresponds to a new application disaster recovery group;

incorporating the one or more new datastores into a new application disaster recovery group plan; and entering the new application disaster recovery group plan into a disaster recovery orchestration of the IaaS.

20. The computer program product of claim 17 wherein the information handling system performs further actions comprising:

receiving a disaster recovery test list from a user that identifies a test set of virtual machines;

determining one or more disaster recovery plans corresponding to the test set of virtual machines;

sorting the one or more disaster recovery plans in an order based on their corresponding recovery plan order; and executing the one or more disaster recovery plans in an order, based in part, by their corresponding recovery plan priority.

* * * * *